United States Patent [19]

Piazza, Sr. et al.

[11] Patent Number: 4,786,159
[45] Date of Patent: Nov. 22, 1988

[54] EYEGLASSES WITH PROTECTOR MEMBER

[75] Inventors: Rocco C. Piazza, Sr.; Rocco C. Piazza, Jr., both of Austin, Tex.

[73] Assignee: Improved Glasses, Inc., Houston, Tex.

[21] Appl. No.: 918,988

[22] Filed: Oct. 15, 1986

[51] Int. Cl.⁴ .............................................. G02C 5/12
[52] U.S. Cl. ..................................... 351/132; 351/158
[58] Field of Search ...................... 351/78, 79, 80, 81, 351/82, 87, 88, 44, 47, 137, 132, 139, 138, 158; 2/9, 12, 13, 206

[56] References Cited

U.S. PATENT DOCUMENTS

| | | | |
|---|---|---|---|
| 202,218 | 9/1865 | Robison | D257/1 |
| 387,709 | 8/1888 | Cole | 2/12 |
| 1,048,191 | 12/1912 | Maurice | D16/123 |
| 1,070,584 | 8/1913 | Byron | 2/206 |
| 1,436,313 | 11/1922 | Hafer | 2/206 |
| 1,635,867 | 7/1927 | Tully | 351/136 |
| 1,668,323 | 1/1928 | King | 351/132 |
| 1,761,664 | 6/1930 | Harris | 2/9 |
| 1,962,818 | 6/1934 | Hoffman | 2/9 |
| 2,037,772 | 4/1936 | Everett et al. | 2/12 |
| 2,197,973 | 4/1940 | Everett et al. | 2/13 |
| 2,233,698 | 3/1941 | Girouard | 2/206 |
| 2,363,557 | 11/1944 | Schauweker | 2/9 |
| 2,364,354 | 12/1944 | Felch | 2/206 |
| 2,519,561 | 8/1950 | Gillman et al. | 2/206 |
| 2,669,717 | 2/1954 | Diggs | 2/9 |
| 3,346,875 | 10/1967 | Weisberger | 2/9 |

FOREIGN PATENT DOCUMENTS 525673  1/1954  Belgium .

*Primary Examiner*—Rodney B. Bovernick
*Assistant Examiner*—Jay Ryan
*Attorney, Agent, or Firm*—Browning, Bushman, Zamecki & Anderson

[57] ABSTRACT

An improved pair of eyeglasses for use by a wearer including a frame member having lens rim portions and a nose bridge portion for connecting the lens rim portions together, with lens members adapted to be fitted within the lens rim portions and securing means with the frame membr for securing the frame member with the wearer when in use by the wearer. The improved pair of eyeglasses further includes a protector member mounted adjacent the nose bridge portion for protecting the nose of the wearer from harmful environmental effects, with the protector member being movable between a first position substantially covering the nose of the wearer and a second position wherein the protector member is substantially stowed adjacent the nose bridge portion, as is desired by the wearer.

19 Claims, 1 Drawing Sheet

EYEGLASSES WITH PROTECTOR MEMBER

FIELD OF THE INVENTION

The present invention relates to eyeglasses and more particularly, to those having protective features for the wearer.

BACKGROUND OF THE INVENTION

It has long been known that it is desirable to protect tender portions of the face from the adversities of various types of harsh environments. Such harsh environments may include the direct rays of the sun, extremes of cold and/or wind. Any of these adverse environmental conditions may ultimately result in tissue damage to portions of the body that are exposed to such effects. In this regard, the area about the face is particularly vulnerable to such adverse environmental effects. The eyes, ears and nose represent tender areas subject to increased deterioration with increased exposure to such adverse environmental effects.

DESCRIPTION OF THE PRIOR ART

It has long been known that it is desirable to provide some type of protective covering to shield the nose from the extremes of weather and/or sun. For example, U.S. Pat. Nos. 1,070,584; 1,436,313; and 1,761,664 provide examples of various types of nose protectors used in the past for protecting sensitive nose tissues.

Furthermore, it is known that face shields for protecting tender portions of the face may be removably attached to various types of eyeglasses, such as shown in U.S. Pat. No. 2,363,557. Indeed, in some instances eyeglasses have been formed having a nose protector integral therewith, such as shown in U.S. Pat. No. Des. 202,218, U.S. Pat. Nos. 387,709; and 2,037,772. Various types of other face protectors include those incorporating a combined nose and lip protector such as shown in U.S. Pat. No. 3,346,875 and those including combined sunglasses and face protectors as disclosed in U.S. Pat. No. 2,669,717. Furthermore, it is known that removably mounted nose protectors provide certain advantages as disclosed in U.S. Pat. Nos. 1,048,191; 1,962,818; 2,197,973; 2,233,698; 2,364,354; 2,519,561; and, Belgian Patent Number 525,673.

However, so far as known, no eyeglasses incorporate a nose protector member wherein such member is not only flexible but is further convertible from a position shielding the nose of the wearer from adverse environmental effects while movably mounted with the eyeglass frame to a second position where the nose protector member is stowed and not a hindrance to normal eyeglass wearing.

SUMMARY OF THE INVENTION

The present invention relates to a new and improved pair of eyeglasses for use by a wearer wherein the eyeglasses typically include a frame member having first and second lens rim portions and a nose bridge portion for interlocking said first and second lens rim portions together, wherein a protector member is mounted adjacent the nose bridge portion for protecting the nose of the wearer from harmful environmental effects, with the protector member being movable between a first position substantially covering the nose of the wearer to a second position wherein the protector member is substantially stowed adjacent the nose bridge, as is desired by the wearer.

DESCRIPTION OF THE PREFERRED EMBODIMENT

Figure 1:
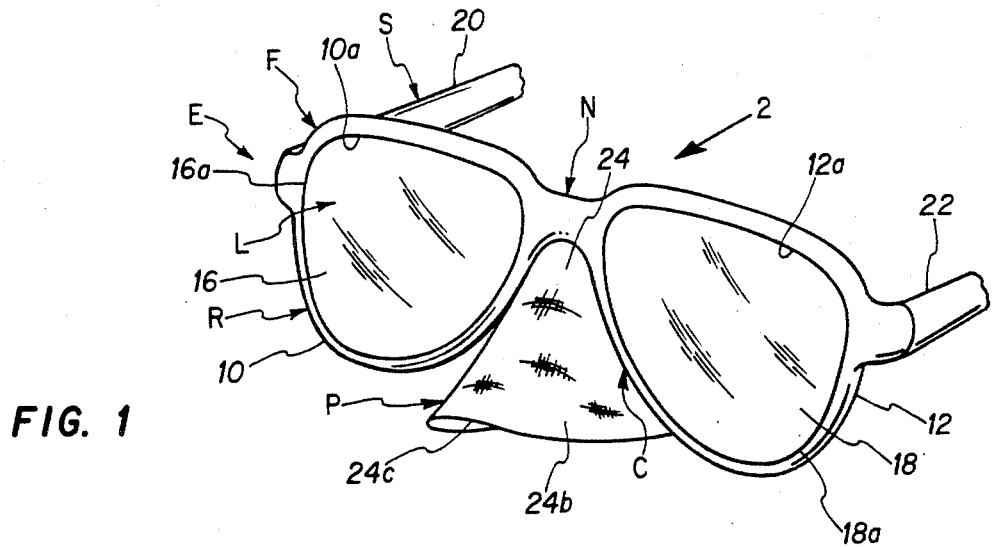
FIG. 1 is an isometric, partly sectional view of the improved pair of eyeglasses of the present invention showing the protector means in the first position for substantially covering the nose of the wearer.

The improved eyeglasses of the present invention is designated generally by the letter E. The eyeglasses E include a frame member F having lens rim portions R and a nose bridge portion N for interconnecting such lens rim portions R. Lens members L are adapted to be fitted within the lens rim portions R. Securing means S are mounted with the frame member F for securing the frame member F with the wearer when in use by the wearer. Protector means P is mounted with the frame member F for protecting the nose of the wearer from environmental effects as is set forth more fully hereinbelow.

The improved eyeglasses E of the present invention includes a frame member F. The frame member F includes lens rim portions R which include a first lens rim portion 10 and a second lens rim portion 12. The first and second lens rim portions 10, 12 are formed generally in an ovaloid, rectangular, or any other suitable configuration having an interior perimeter surface 10a, 12a for receiving lens members L. The frame member F of the eyeglasses E further includes a nose bridge portion N for interconnecting the first and second lens rim portions 10, 12 of the lens rim portions R. The nose bridge portion N includes nose bridge 14 which includes a lower contour surface 14a. Basically, the nose bridge 14 acts to interconnect the first and second lens rim portions 10, 12 of the lens rim portions R. Furthermore, the lower contour surface 14a of the nose bridge 14 is co-extensive and a continuation of contour surfaces 10b, 12b of the first and second lens rim portions 10, 12 respectively. Preferably, contour surface 10b originates at a point generally shown as 10c (FIG. 2) and extends upwardly towards the nose bridge portion for merging with contour surface 14a, which in turn merges with contour surface 12b, which extends to a point generally shown as 12c. Contour surfaces 10b, 14a, 12b form the contour surface C of the present invention.

Preferably, the frame member F may be made of any high strength, lightweight material which may include plastic, carbon-graphite composites, aluminum, or any other suitable materials. The lens members L including first and second lens members 16, 18 are adapted to be fitted within the lens rim portions R such that first lens member 16 is fitted within the interior surface 10a of first lens rim portion 10 while second lens member 18 is adapted to be fitted within the interior surface 12a of second lens rim portion 12. It is preferred that the outer peripheral surface 16a, 18a of the first and second lens members 16, 18, respectively, be compatibly formed to be received in the interior surfaces 10a, 12a of the first and second lens rim portions 10, 12, respectively.

Preferably, the eyeglasses E of the present invention further includes securing means S mounted with the frame member F for securing the frame member F with the wearer when in use by the wearer. The securing means S may include first and second temples 20, 22, respectively which are hingeably mounted with the first and second lens rim portions 10, 12, respectively in any suitable fashion. Alternatively, the securing means S may include a suitable clip (not shown) for securing the frame member F to another pair of eyeglasses (not shown), to a hat (not shown) or any other device capable of supporting the frame member F. Such securing means S may be made of any lightweight, high strength materials including plastic, carbon-graphite composites, aluminum or any other suitable materials.

The first and second lens members 16, 18 may be of a clear, non-prescription ground glass or plastic, a prescription ground glass or plastic, and/or prescription or non-prescription tinted plastic or glass, depending upon use. For example, clear non-prescription safety glass or plastic may be used in the instance of eye protection for the wearer around power or welding equipment. Alternatively, by way of example, tinted lenses may be used when the eyeglasses E are used as sunglasses. It is preferred that the type of lens may be any type of lens useful in eyeglasses of all types, depending upon application and need required to be met by the wearer.

The eyeglasses E of the present invention further include protector means P mounted adjacent the nose bridge portion N for protecting the nose of the wearer from harmful environmental effects. The protector means P includes protector member 24 which may be formed of any suitable soft, flexible material. Such materials may include leather, cloth, nylon, other synthetic materials or any other of a wide variety of flexible, soft materials, yet being sufficiently strong to protect the nose of the wearer from harmful environmental effects. Such harmful environments may include radiation from the sun or other harmful radiation sources, the adverse effects of wind, as well as the effects of cold and/or adverse working conditions.

Preferably, the protector member 24 of the protector means P is formed having a joining surface 24a, an outer protector sheet 24b, an edge surface 24c, an inner protector sheet 24d, a first fastener mounting area 24e and a second fastener mounting area 24f. Preferably, the protector member 24 is mounted with the frame member F such that the joining surface 24a is joined with the frame member F along the contour surface C including surfaces 10b, 14a, 12b which are shaped in such a fashion to preferably conform with the nose of the wearer for providing comfort to the wearer. The outer protector sheet 24b is adapted to face the adverse environmental conditions such as sun, wind, cold and the like whereas the inner protector sheet 24d is adapted to be positioned adjacent the nose of the wearer when in the position shown in FIG. 1.

Figure 3:
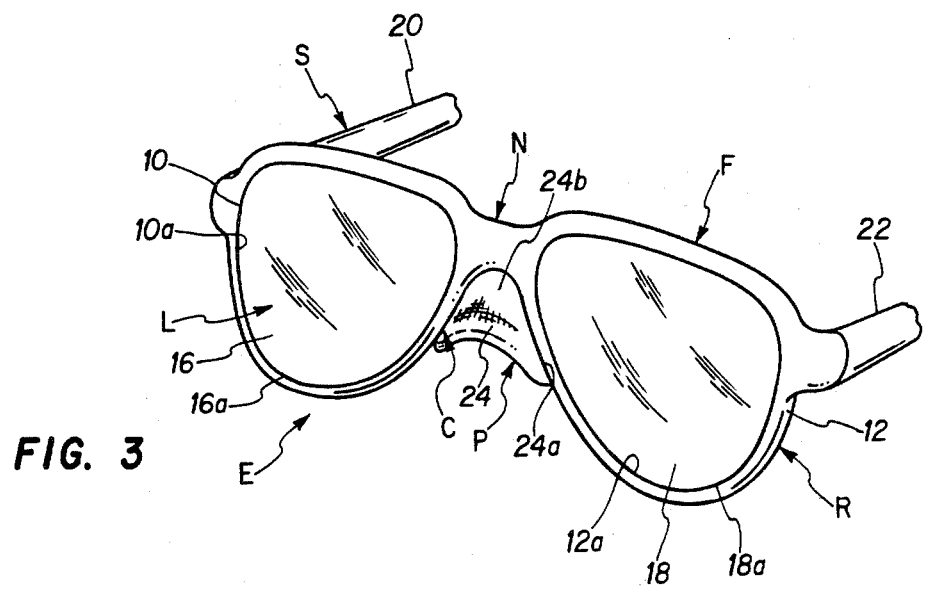

The protector means P is movable between a first position substantially covering the nose of the wearer as shown in FIG. 1 and a second position wherein the protector means P is substantially stowed adjacent the nose bridge portion N as shown in FIG. 3. Thus, the protector means P is movable between such first and second positions as is desired by the wearer. Preferably, when the protector means P including the protector member 24 is mounted with the frame member F, the adjoining surface 24a of the protector member 24 is in substantially continuous contact with the contour surface C of surfaces 10b, 14a, 12b. Such joining may be accomplished by gluing, or in any fashion securing the protector member 24 with the frame member F at the joining surfaces.

The eyeglasses E of the present invention further includes a fastening means M for fastening the protector means P with the frame member F when the protector means P is in the second position (FIG. 3) to prevent inadvertent movement of the protector means P to the first position (FIG. 1). Preferably, the fastening means is with the protector means P for insuring proper positioning of the protector means P.

Figure 2:
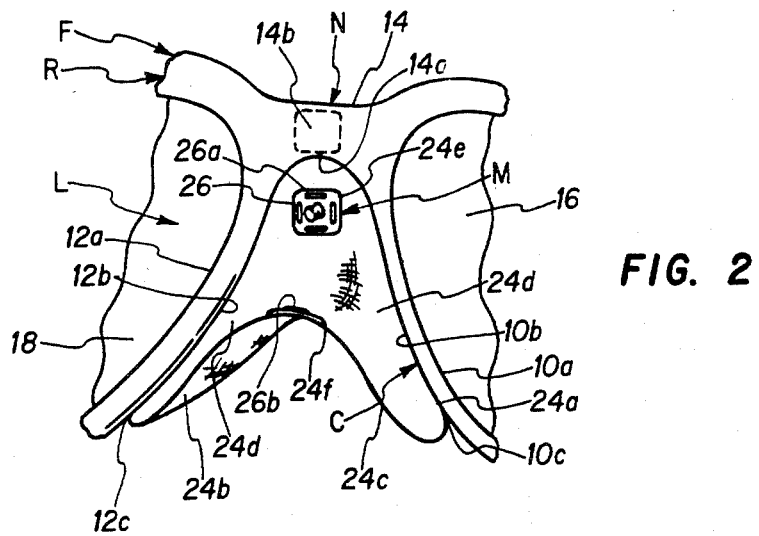
FIG. 2 is a sectional, enlarged view of the improved pair of eyeglasses of the present invention, as viewed in the direction of the arrow 2 of FIG. 1, showing details of the protector means and fastening means of the present invention; and, FIG. 3 is an isometric view of the improved eyeglasses of the present invention showing the protector means in the second position wherein the protector means is substantially stowed adjacent the nose bridge portion of the eyeglasses.

As best seen in FIG. 2, the fastening means M may include a snap fastener 26 including fastener parts 26a and 26b. As shown in FIG. 2, fastener part 26a is preferably mounted with protector means P adjacent first fastener mounting area 24e. Alternatively, part 26a of the snap fastener 26 may be mounted with the nose bridge 14 of nose bridge portion N adjacent to the fastener mounting area 14b (depicted by dotted lines) if such is desired. The second fastener part 26b of snap fastener 26 may be mounted with the protector member 24 adjacent second fastener mounting area 24f, which preferably is approximately central of the edge surface 24c and adjacent thereto. As such, the protector member 24 may be alternatively in either the first position so that the nose of the wearer of the eyeglasses E is fully protected or such may be in the second position so that the protector means P is substantially stowed adjacent to the nose bridge portion N. The fastener parts 26a, 26b of the fastener 26 of the fastening means M adjoin one another to prevent inadvertent slippage from the second position of FIG. 3 to the position of FIG. 1 when it is preferred that such remain in the second position of FIG. 3 by the wearer.

The fastening means M may include a variety of fasteners such as the snap fasteners 26 as shown or alternatively, may include any suitable hook and eye type of fastener (not shown) such as that of the "Velcro" brand fasteners, magnetic fasteners or any other suitable type of fasteners. In the event magnetic fasteners were desired, one portion of the fastening means M could be formed with the fastener mounting area 14b of the nose bridge 14, while the other could be mounted with the protector member 24 adjacent second fastener mounting area 24f.

Thus, the eyeglasses E of the present invention provides a new, improved pair of eyeglasses capable of protecting the wearer's nose from the detrimental, and in some cases, health threatening, impact of adverse environmental conditions. The improved eyeglasses E provide for a protector means P that is "convertible" between two operating positions—most notably, being movable between the first position as shown in FIG. 1, and the second position as shown in FIG. 3. With the protector means P in the second position, it should be appreciated that such may provide some cushioning and enhanced comfort for the wearer because of the existence of the protector member 24 being adjacent the nose bridge portion N of the frame member F. Furthermore, with the protector means P in the first position, the nose of the wearer of the eyeglasses E of the present invention is able to protect the wearer's nose from a wide variety of adverse environmental effects and conditions.

The foregoing disclosure and description of the invention are illustrative and explanatory thereof, and various changes in the size, shape and materials, as well as the details of the illustrated construction may be made without departing from the spirit of the invention.

I claim:

1. An improved pair of sunglasses for use by a wearer, comprising:
   a frame member including first and second lens rim portions, a nose bridge portion interconnecting said first and second lens rim portions, and a contour surface formed by lower surfaces of said first and second lense rim portions and a lower surface of said nose bridge portion, with said contour surface substantially conforming to the nose of the wearer;
   first and second lens members adapted to be fitted within said first and second lens rim portions, respectively;
   securing means for securing said frame member with the wearer when in use by the wearer; and,
   protector means mounted with said frame member substantially continuous along said contour surface and adjacent said nose bridge portion for protecting the nose of the wearer from harmful environmental effects, said protector means being movable between a first position substantially covering the nose of the wearer and a second position wherein said protector means is substantially stowed adjacent said nose bridge portion, as is desired by the wearer.

2. The improved pair of eyeglasses of claim 1, wherein said protector means cushions the mounting of said frame member on the wearer's nose when in said second position.

3. The improved pair of eyeglasses of claim 1, wherein:
   said protector means is of a soft, flexible material to enhance ease of movement between said first and second positions and further to enhance comfort of the wearer.

4. The improved pair of eyeglasses of claim 1, further including:
   fastening means with said protector means for fastening said protector means in said second position to prevent undesired movement thereof to said first position.

5. The improved pair of eyeglasses of claim 4 wherein said fastening means includes a snap type fastener.

6. The improved pair of eyeglasses of claim 4, wherein said fastening means includes a hook and eye type fastener.

7. The improved pair of eyeglasses of claim 6, wherein said fastening means includes a magnetic fastener.

8. An improved pair of eyeglasses for use by a wearer, comprising:
   a unitary frame member including first and second lens rim portions, a nose bridge portion interconnecting said first and second lens rim portions, and a contour surface formed by lower surfaces of said first and second lens rim portions and a lower surface of said nose bridge portion, with said contour surface substantially conforming to the nose of the wearer;
   first and second lens members adapted to be fitted within said first and second lens rim portions, respectively;
   securing means for securing said frame member with the wearer; and
   protector means mounted to said frame member adjacent said nose bridge portion for protecting the nose of the wearer from harmful environmental effects while said eyeglasses are worn by the wearer, said protector means being movable between a first position substantially covering the nose of the wearer and a second position wherein the protector means is substantially stowed adjacent said nose bridge portion, such that the eyeglasses may be worn by the wearer with the protector means selectively positioned in either said first or second position.

9. The improved pair of eyeglasses of claim 8, wherein:
   said protector means is of a soft, flexible material to enhance ease of movement between said first and second positions and further to enhance comfort of the wearer while the eyeglasses are worn in the second position.

10. The improved pair of eyeglasses of claim 8, further including:
    fastening means with said protector means for fastening said protector means in said second position to prevent undesired movement thereof to said first position.

11. The improved pair of eyeglasses of claim 10, wherein said fastening means includes a snap type fastener.

12. The improved pair of eyeglasess of claim 8, wherein the securing means comprises first and second temples hingably mounted to the first and second lens rim portions, respectively.

13. An improved pair of eyeglasses for use by wearer comprising:
    a frame member including first and second lens rim portions, a nose bridge portion interconnecting said first and second lens rim portions, and a contour surface formed by lower surfaces of said first and second lens rim portions and a lower surface of said nose bridge portion, with said contour surface substantially conforming to the nose of the wearer;
    first and second lens members adapted to be fitted within said first and second lens rim portions, respectively; and
    protector means mounted with said frame member along said lower surfaces of said first and second lens rim portions for protecting the nose of the wearer from harmful environmental effect, said protector means being a flexible material movable between a first position substantially covering the nose of the wearer and a second position wherein the protector means is substantially stowed adjacent said nose bridge portion, such that the eyeglasses may be worn by the wearer with the protector means selectively positioned in either said first or second position.

14. The improved pair of sunglasses of claim 13, wherein said protector means cushions the mounting of said frame member on the wearer's nose when in said second position.

15. The improved pair of eyeglasses of claim 13, further including:

fastening means with said protector means for fastening said protector means in said second position to prevent undesired movement thereof to said first position.

16. The improved pair of eyeglasses of claim 15, wherein said fastening means includes a snap type fastener.

17. The improved pair of eyeglasses of claim 15, wherein said fastening means includes a hook and eye type fastener.

18. The improved pair of eyeglasses of claim 15, wherein said fastening means includes a magnetic fastener.

19. An improved pair of eyeglasses of claim 13, further comprising:

securing means for securing said frame member with the wearer when in use by the wearer.

* * * * *

UNITED STATES PATENT AND TRADEMARK OFFICE
CERTIFICATE OF CORRECTION

PATENT NO. : 4,786,159
DATED : November 22, 1988
INVENTOR(S) : Rocco C. Piazza, Sr.; Rocco C. Piazza, Jr.

It is certified that error appears in the above-identified patent and that said Letters Patent is hereby corrected as shown below:

Column 5, line 9, claim 1, delete "sunglasses" and insert therefor
--eyeglasses--.

Signed and Sealed this

Thirtieth Day of May, 1989

Attest:

DONALD J. QUIGG

Attesting Officer

Commissioner of Patents and Trademarks